(12) United States Patent
Hall et al.

(10) Patent No.: US 8,342,248 B2
(45) Date of Patent: Jan. 1, 2013

(54) APPARATUS FOR VENTING AN ANNULAR SPACE BETWEEN A LINER AND A PIPELINE OF A SUBSEA RISER

(75) Inventors: Scott Hall, Aberdeen (GB); Sylvain Denniel, Aberdeen (GB); Jeroen Remery, Saint Germain en Laye (FR)

(73) Assignee: Technip France SA (FR)

( * ) Notice: Subject to any disclaimer, the term of this patent is extended or adjusted under 35 U.S.C. 154(b) by 484 days.

(21) Appl. No.: 12/594,428

(22) PCT Filed: Feb. 8, 2008

(86) PCT No.: PCT/GB2008/000440
§ 371 (c)(1),
(2), (4) Date: Nov. 6, 2009

(87) PCT Pub. No.: WO2008/122749
PCT Pub. Date: Oct. 16, 2008

(65) Prior Publication Data
US 2010/0108321 A1    May 6, 2010

(30) Foreign Application Priority Data

Apr. 5, 2007  (GB) .................................. 0706745.7
Aug. 7, 2007  (GB) .................................. 0715347.1

(51) Int. Cl.
*E21B 43/01* (2006.01)

(52) U.S. Cl. ........ 166/344; 166/345; 166/347; 166/351; 166/367

(58) Field of Classification Search .................. 166/335, 166/344, 345, 347, 351, 352, 357, 367, 369; 138/140, 148
See application file for complete search history.

(56) References Cited

U.S. PATENT DOCUMENTS

| | | | | |
|---|---|---|---|---|
| 3,301,277 A | * | 1/1967 | Kelly | 138/114 |
| 3,506,039 A | * | 4/1970 | Marriott | 138/114 |
| 3,643,751 A | * | 2/1972 | Crickmer | 175/7 |
| 4,063,602 A | * | 12/1977 | Howell et al. | 175/7 |

(Continued)

FOREIGN PATENT DOCUMENTS

GB    2 384 535    7/2003

(Continued)

OTHER PUBLICATIONS

UKIPO Search Report on the corresponding UK Patent Application No. 0715347.1, dated Apr. 7, 2008 (1 page).

(Continued)

*Primary Examiner* — Matthew Buck
(74) *Attorney, Agent, or Firm* — Ostrolenk Faber LLP

(57) ABSTRACT

An apparatus for venting an annular space between a liner and a pipeline of a subsea riser used for conveying hydrocarbons, the apparatus comprising a permeate recovery device for recovering permeate passing through the liner into the annular space. The permeate recovery device includes a first vent port in a wall of the pipeline at or adjacent a lower region of the pipeline and communicating with a permeate recovery line defining a flow path between the annular space and a permeate collection vessel. A one-way valve is associated with the permeate recovery line for preventing flow from the permeate recovery line into the annular space. A gaseous permeate recovery line connected to a second vent port at an upper region of the pipeline defining a flow of gaseous permeate from the annular space.

26 Claims, 7 Drawing Sheets

U.S. PATENT DOCUMENTS

| | | | | |
|---|---|---|---|---|
| 4,091,881 | A * | 5/1978 | Maus | 175/7 |
| 4,216,834 | A * | 8/1980 | Wardlaw | 175/7 |
| 4,291,772 | A * | 9/1981 | Beynet | 175/5 |
| 4,634,314 | A * | 1/1987 | Pierce | 405/224.2 |
| 5,228,506 | A * | 7/1993 | Pearce | 166/81.1 |
| 5,232,475 | A * | 8/1993 | Jepson | 95/260 |
| 5,343,941 | A * | 9/1994 | Raybon | 166/53 |
| 5,351,753 | A * | 10/1994 | Golson | 166/81.1 |
| 5,988,691 | A * | 11/1999 | Cruickshank | 285/55 |
| 6,062,313 | A * | 5/2000 | Moore | 166/357 |
| 6,109,829 | A * | 8/2000 | Cruickshank | 405/169 |
| 6,129,107 | A * | 10/2000 | Jackson | 137/312 |
| 6,276,455 | B1 * | 8/2001 | Gonzalez | 166/357 |
| 6,321,844 | B1 * | 11/2001 | Thiebaud et al. | 166/345 |
| 6,328,345 | B1 * | 12/2001 | Moore et al. | 285/123.1 |
| 6,446,671 | B2 * | 9/2002 | Armenia et al. | 138/109 |
| 6,454,022 | B1 * | 9/2002 | Sangesland et al. | 175/7 |
| 6,457,529 | B2 * | 10/2002 | Calder et al. | 166/368 |
| 6,578,637 | B1 * | 6/2003 | Maus et al. | 166/350 |
| 6,634,387 | B1 * | 10/2003 | Glejbøl | 138/104 |
| 6,634,388 | B1 * | 10/2003 | Taylor et al. | 138/114 |
| 6,648,081 | B2 * | 11/2003 | Fincher et al. | 175/25 |
| 6,651,745 | B1 * | 11/2003 | Lush et al. | 166/357 |
| 6,668,943 | B1 * | 12/2003 | Maus et al. | 175/5 |
| 7,086,472 | B1 * | 8/2006 | Incoronato | 166/357 |
| 7,185,705 | B2 * | 3/2007 | Fontana | 166/356 |
| 7,191,830 | B2 * | 3/2007 | McVay et al. | 166/242.1 |
| 7,210,530 | B2 * | 5/2007 | Lush et al | 166/357 |
| 7,264,058 | B2 * | 9/2007 | Fossli | 166/367 |
| 7,677,329 | B2 * | 3/2010 | Stave | 175/5 |
| 7,866,399 | B2 * | 1/2011 | Kozicz et al. | 166/367 |
| 7,958,948 | B2 * | 6/2011 | Stave | 175/7 |
| 2004/0182567 | A1 * | 9/2004 | Matthews | 166/81.1 |
| 2004/0238177 | A1 * | 12/2004 | Fossli | 166/364 |

FOREIGN PATENT DOCUMENTS

| | | |
|---|---|---|
| WO | WO 00/05506 | 2/2000 |
| WO | WO 00/08368 | 2/2000 |
| WO | WO 00/17479 | 3/2000 |
| WO | WO 01/94820 | 12/2001 |
| WO | WO 03/062691 | 7/2003 |

OTHER PUBLICATIONS

Notification Concerning Transmittal of International Preliminary Report on Patentability with a mailing date of Oct. 15, 2009, International Preliminary Report on Patentability, and Written Opinion of the International Searching Authority (6 pages total) in corresponding International application No. PCT/GB2008/000440.

International Search Report dated Jul. 1, 2008, issued in corresponding international application No. PCT/GB2008/000440.

* cited by examiner

US 8,342,248 B2

APPARATUS FOR VENTING AN ANNULAR SPACE BETWEEN A LINER AND A PIPELINE OF A SUBSEA RISER

CROSS REFERENCE TO RELATED APPLICATION

The present application is a 35 U.S.C. §§371 national phase conversion of PCT/GB2008/000440, filed Feb. 8, 2008, which claims priority of Great Britain Application Nos. 0706745.7, filed Apr. 5, 2007, and 0715347.1, filed Aug. 7, 2007, the disclosure of which is incorporated by reference herein. The PCT International Application was published in the English language.

BACKGROUND OF THE INVENTION

The present invention relates to an apparatus for venting an annular space between a liner and the pipeline of a riser for conveying hydrocarbons.

Grooved liners are a technology used within steel pipelines as a cost efficient alternative to using Corrosion Resistant Alloys (CRA's) to construct pipelines transporting highly corrosive substances such as hydrocarbons. The system involves inserting a plastic liner, complete with a number of longitudinal external grooves, into the pipeline. The aim of the liner is to protect the carbon steel pipe from the highly corrosive nature of the production fluids. The grooves act as a method of transporting the gases/liquids that inevitably permeate through the liner to a venting location where they are released to atmosphere or stored in a collection vessel.

It is desirable to utilise the technology for vertical applications, such as production risers, Steel Catenery Risers (SCR) etc. Such applications involve lining vertical pipelines in exactly the same way as a standard horizontal pipeline. These vertical lines act as a method of transporting the production fluids from the main production transport line to the surface. In some applications, the production fluids are transported down to the seabed. Since some of these vertical lines can be exposed to depths in excess of 1000 m, a method of aiding flow to the surface is usually required. One such method is Gas Lift, in which processed gas is pumped cyclically through the system to push the fluids from the seabed to the surface.

In the vertical orientation, the liquid permeate will condense on the inner walls of the pipeline and fall to the base of the riser under gravity, where a column of liquid would quickly develop between the liner and the pipeline. This phenomenon dictates that a reliable venting system is required for the removal of the condensed permeate which collects at the base of the riser. This is necessary to avoid the situation where the liner experiences external overpressure and possible collapse in the event that there is a loss of internal pressure in the bore.

SUMMARY OF THE INVENTION

According to the present invention there is provided an apparatus for venting an annular space between a liner and a pipeline of a subsea riser for conveying hydrocarbons, said apparatus comprising permeate recovery means for recovering permeate passing through the liner into said annular space.

Preferably said permeate recovery means comprises a first vent port provided in a wall of the pipeline at or adjacent a lower region of the pipeline and communicating with a permeate recovery line defining a flow path between said annular space and a permeate collection vessel. Preferably a one-way valve is associated with said permeate recovery line for preventing flow from said permeate recovery line into said annular space.

The permeate collection vessel may be mounted on or formed integrally with a suction pile upon which the riser is supported. Alternatively the permeate collection vessel may be formed from one or more pipe sections, the ends of which are closed by flanges or plugs.

In one embodiment, said permeate collection vessel includes a first outlet port provided in an upper region of the collection vessel, said first outlet port communicating with a gaseous permeate recovery line, and a second outlet port provided in a lower region of the collection vessel, said second outlet port communicating with a liquid permeate recovery line. One or both of said gaseous and liquid permeate recovery lines may be connected to pump means or other source of vacuum for pumping or drawing said gaseous and/or liquid permeate to the surface and for generating a vacuum in the collecting and/or disposing means.

The gaseous collection line and/or the liquid recovery line may be connected to a collection or storage vessel on the surface to permit measurement and/or analysis of the collected permeate.

In a second embodiment, a second vent port may be provided in a wall of the pipeline at or adjacent an upper region of the pipeline and communicating with a permeate recovery line for venting gaseous permeate from said annular space, said permeate collection vessel connected to said first vent port collecting primarily liquid permeate therefrom. A non-return valve may be associated with the second vent port and/or the permeate recovery line for preventing the return flow of permeate from said permeate recovery line to said annular space. The gaseous permeate recovery line may be connected to a vacuum source to draw gaseous permeate from said annular space. A storage vessel may be provided for storing said collected permeate.

The permeate collection vessel associated with said first vent port may be located on the seabed or an adjacent structure. The permeate collection vessel may be provided with a vacuum pump to aid extraction of liquid permeate from the annular space adjacent said first vent port. The permeate collection vessel may be provided with valve means to permit disconnection and recovery of the permeate collection vessel to enable the vessel to be drained and/or replaced.

In a third embodiment, the permeate collection vessel may be associated with a gas lift system for urging production fluids up the riser, whereby liquid permeate may be entrained out of the permeate collection vessel by means of a flow of high speed and/or high pressure gas and subsequently passed into the riser with the production fluids, thereby returning the liquid permeate into the liner and recovering the liquid permeate to the surface with the production fluid.

Said high speed gas may be injected into the permeate collection vessel over the surface of collected liquid permeate within the collection vessel, preferably in the direction of a permeate and high speed gas outlet, to entrain said liquid permeate into said high speed gas flow. Alternatively said high speed gas may be injected into a lower region of the condensate recovery vessel below the liquid level to entrain the liquid permeate into said high speed gas flow.

A second vent port may be provided in a wall of the pipeline at or adjacent an upper region of the pipeline and communicating with a permeate recovery line connected, preferably to a vacuum pump, for venting gaseous permeate from said annular space, said permeate collection vessel collecting primarily liquid permeate from said first vent port.

Alternatively said first vent may be utilised to collect both gaseous and liquid condensate, said gaseous and liquid condensate being entrained into said high speed gas flow of the gas lift system. The flow of high speed gas into the condensate collection vessel may be utilised to create a vacuum in the collection vessel, possible by means of a venturi effect, actively drawing condensate from said annular space. Alternatively a vacuum pump may be used for generating a vacuum in the permeate collection vessel. Such arrangement advantageously avoids the need for any permeate recovery lines extending to the surface.

BRIEF DESCRIPTION OF THE DRAWINGS

Embodiments of the present invention will now be described, by way of example only, with reference to the accompanying drawings, in which.

DESCRIPTION OF PREFERRED EMBODIMENTS

Figure 1:
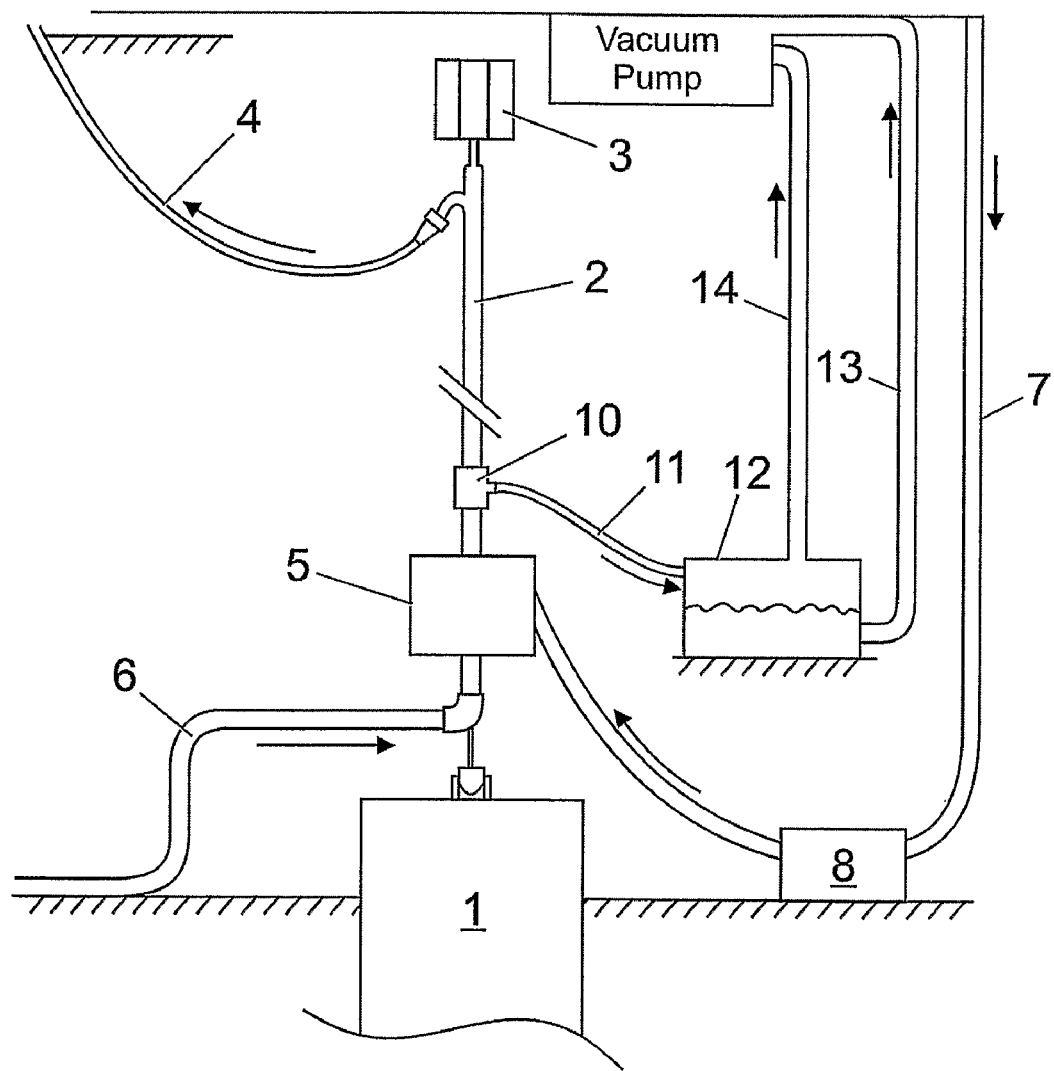
FIG. 1 is a schematic view of a permeate recovery apparatus according to a first embodiment of the present invention.

As shown in the drawings, the riser assembly comprises a suction pile 1 located on the seabed for supporting a lower end of the riser 2. The riser 2 comprises a rigid steel outer pipeline having an inner liner for protecting the steel pipeline from the corrosive effects of the production fluid (typically crude oil and/or natural gas) conveyed by the riser 2.

A buoyancy module 3 supports an upper end of the riser and the production flow is conveyed from an upper end of the riser 2 to a vessel or surface installation by means of a production jumper 4.

A gas lift system 5 is provided at a lower end of the riser for urging the production fluid up the riser 2, the production fluid being fed to the lower end of the riser 2 and the gas lift system 5 via one or more production feed lines 6. High speed gas is supplied from the surface via a feed line 7 connected to a gas lift manifold 8 on the seabed before being injected into a lower end of the riser 2.

In a first embodiment of the present invention, as illustrated in FIG. 1, a first vent port 10 is located as low as possible on the vertical riser 2 for providing communication between an annular space between the liner and the inner walls of the riser 2 and a permeate jumper line 11. The permeate jumper line 11 is connected to a permeate collection tank 12 to collect permeate extracted from said annular space. A non-return valve is provided in the first vent port 10 for preventing return flow of permeate from the permeate jumper line 11 to the annular space.

The permeate collection tank 12 may be located on top of the suction pile 1 and may be integrated into the suction pile 1. Alternatively the permeate collection tank 12 may be located on the seabed separate from the suction pile 1 or may be mounted on other structures of the pipeline assembly.

It is envisaged that the permeate collection tank 12 may be formed from a section of pipeline, plugged at each end with blind flanges. The collection tank 12 may be formed from a number of interconnected pipe sections, stacked on top of one another in parallel relationship.

A liquid permeate recovery line 13 extends from a lower region of the permeate collection tank 12 to a vacuum pump on the surface to draw liquid permeate from the collection tank 12. A gaseous permeate recovery line 14 extends from an upper region of the permeate collection tank 12 to a vacuum pump on the surface to draw gaseous permeate from the collection tank and to generate a vacuum within the collection tank 12 to actively draw permeate from said annular space of the riser 2.

On the topside, the liquid permeate can be drained and/or samples taken for monitoring. The gases can be safely disposed of.

The first embodiment of the invention allows measurement and analysis of permeated gas/liquid from subsea location as opposed to directly venting to atmosphere and can ensure that the necessary venting process does not damage the environment.

Figure 2:
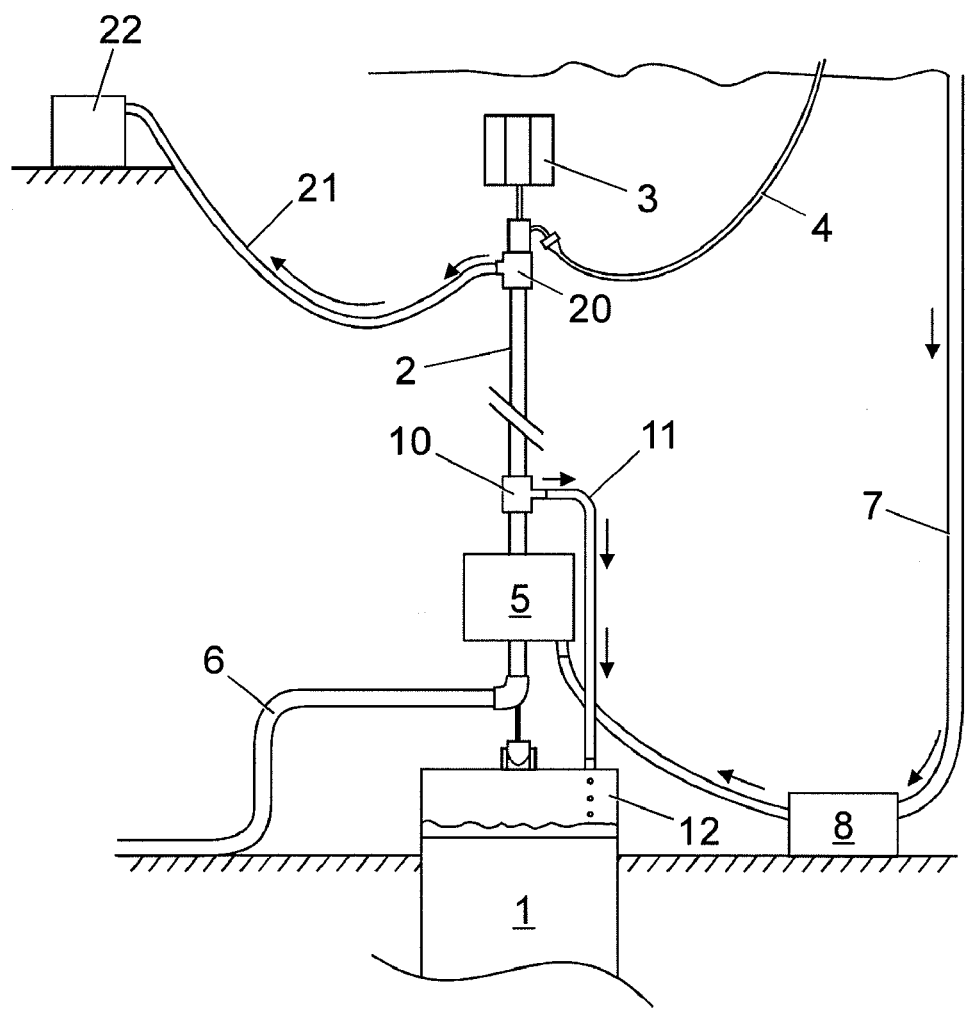
FIG. 2 is a schematic view of a permeate recovery apparatus according to a second embodiment of the present invention.

A second embodiment of the present invention is illustrated in FIG. 2.

In the second embodiment, a second vent port 20 is located in an upper region of the riser 2 for extraction of gaseous permeate from the annular space between the liner and the pipeline of the riser 2. The second vent port 20 is connected to a gaseous permeate jumper 21 leading to a storage tank 22 on the surface.

The second vent port 20 for the gas extraction is located at the top of the riser 2 to ensure the gaseous permeate jumper 21 is as short as possible, limiting the possibility of damage during service. The extraction of the gas will be controlled by limited topside equipment such as a vacuum pump. This equipment could also be of lower specification and hence cheaper than the same equipment required for the first embodiment. On the topside the gases can be safely disposed of.

As with the first embodiment, a first vent port 7 is located at the base of the riser 2. This vent port 7 is as low as possible on the riser 2 to maximise efficiency. The first vent port 7 is attached to liquid permeate jumper 11, complete with anti-return valve, to a liquid permeate collection tank 12, such tank being of sufficient volume to be capable of containing the volume of permeated fluid for the entire life of the pipeline. The collection tank 12 is fitted with a vacuum pump to aid the extraction of fluids.

Figure 3:
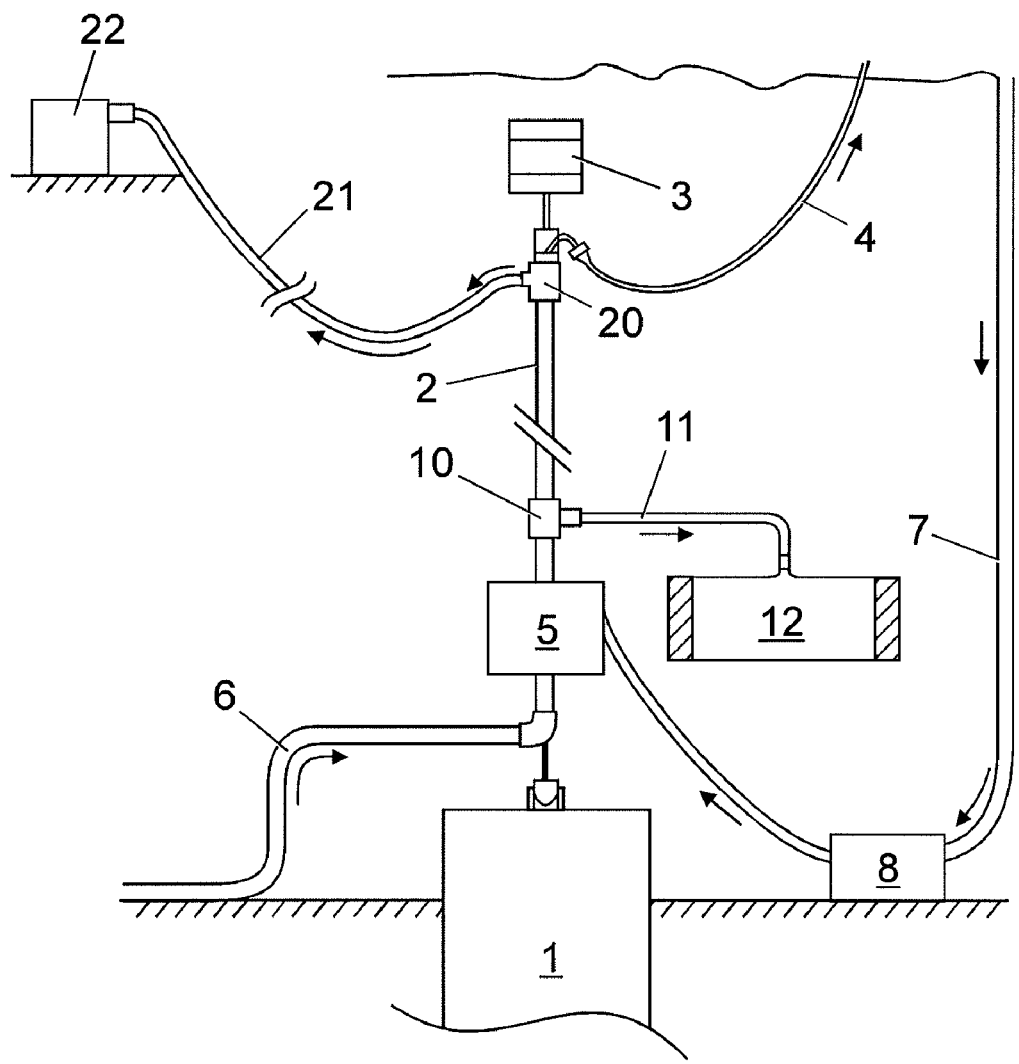
FIG. 3 is a schematic view of a permeate recovery apparatus according to a modification of the second embodiment of the present invention.

There are a number of options for the storage facility:
1. A purpose built storage tank built into the top of the riser suction pile 1. This would allow the liquid permeate to drain down vertically using gravitational force, aided by the vacuum pump. This is shown in FIG. 2.
2. A separate purpose built storage tank secured on the seabed.
3. A section of pipe or multiple sections linked together, both ends fitted with blind flanges. A schematic can be seen in FIG. 3.

Advantages of the second embodiment:
Fluids do not need to be pumped to the surface if the storage tank has adequate volume. This removes the need for umbilical lines from the seabed to the surface. This will reduce the risk of damage in service;

Vacuum pump equipment on topside could be of lower specification than if required to vent from seabed;

Feasible for valves to be closed temporarily for change-out of storage tanks for options 2 & 3. This would not affect production.

Figure 4:
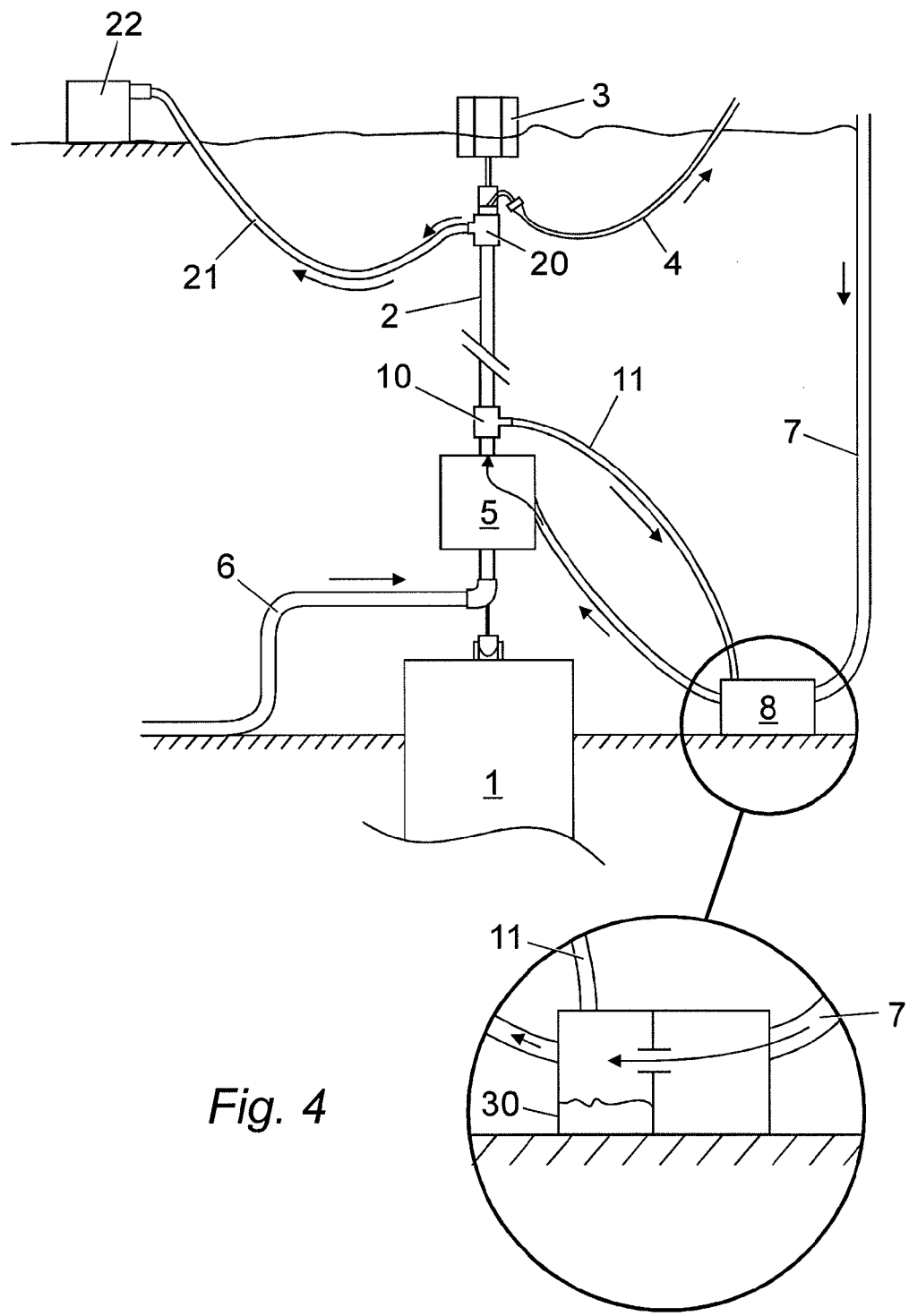
FIG. 4 is a schematic view of a permeate recovery apparatus according to a third embodiment of the present invention.

A third embodiment of the present invention is illustrated in FIG. 4.

Typical vertical lines, such as risers, utilise a Gas Lift system to assist the extraction of production fluids to the surface. The system injects gas at the base of the riser at high pressure with the gas travelling at high velocities. The pressure of the gas lifts the fluids up the riser to the surface.

Figure 5:
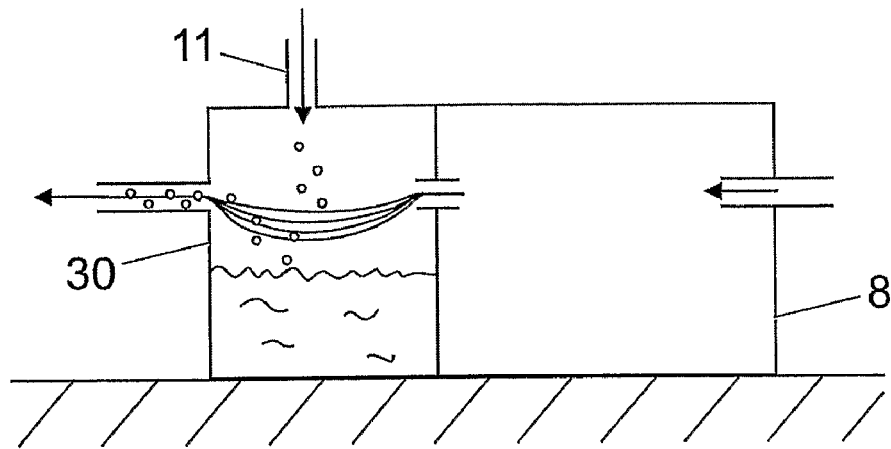
FIG. 5 is a sectional view of a permeate recovery vessel of the apparatus of FIG. 4.

The manifold 8 utilised by the gas lift system 5 on the seabed could be modified to include a small storage tank 30 for the vented liquid permeate. The high pressure, high velocity gas can be routed through the storage tank 30. The small amount of liquid permeate stored in the tank 30 can then be slowly removed along with the high velocity gas, passing over the liquid permeate collected in the tank 30, whereby the liquid permeate passes into the riser 2 with the production fluids (see FIG. 5).

The second vent port 20 for the gas extraction is located at the top of the riser 2 to ensure the extraction jumper 21 is as short as possible, limiting the possibility of damage during service. The extraction of the gas can be controlled by limited topside equipment such as a vacuum pump. This equipment may be of lower specification and hence cheaper than the same equipment required for the first embodiment. On the topside the gases can be safely disposed of.

Figure 6:
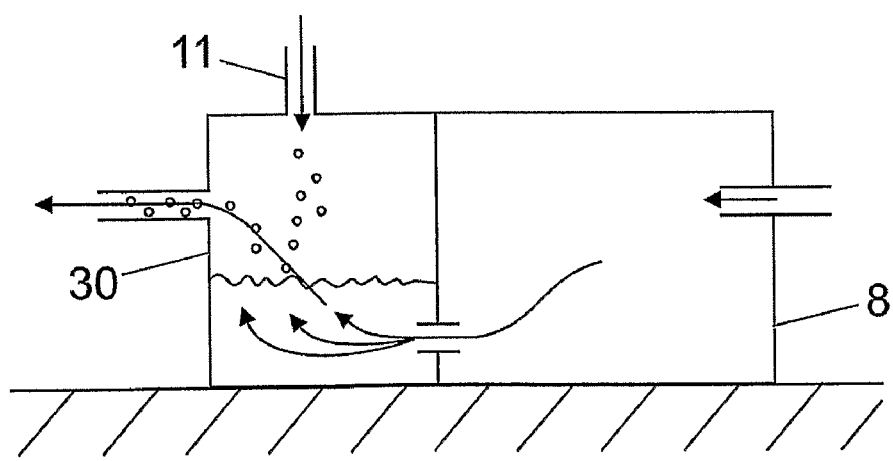
FIG. 6 is a sectional view of a modified permeate recovery vessel of the apparatus of FIG. 4.

A variation on this solution may be to inject the high speed gas through the reservoir of permeated liquid within the tank 30, rather than passing over the top. This would in effect cause a spray which can be introduced into the production flow as described before. A sketch of this variation on the process is shown in FIG. 6.

Advantages of the third embodiment:

No umbilicals are required from the seabed to the surface for transport of permeates. This reduces the risk of damage to the venting system in operation;

No external equipment necessary to draw a vacuum in the annulus—the fluid would drip into the container under gravity and hydrostatic load from head of permeated liquid;

Can be incorporated to current standard gas lift/riser designs;

Vacuum pump equipment on topside could be of lower specification than if required to vent from seabed.

Figure 7:
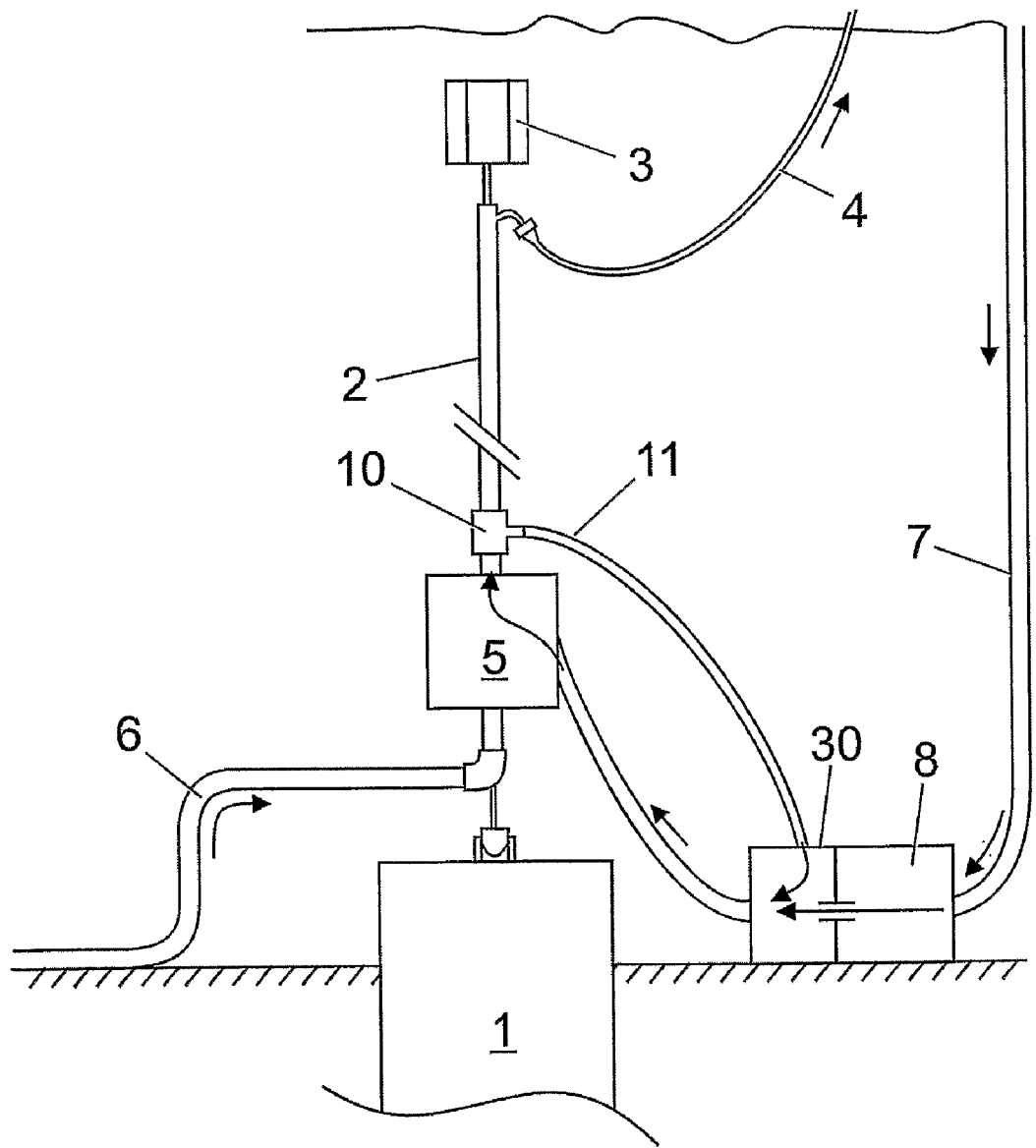
FIG. 7 is a schematic view of a permeate recovery apparatus according to a fourth embodiment of the present invention.

A fourth embodiment of the present invention is illustrated in FIG. 7.

In the fourth embodiment, the gas lift system is used to transport the liquid permeate to the surface via the riser 2. Due to the small amount of liquid permeated, a vacuum may be created in the storage tank 30 that could be used to suck both the liquid and the gaseous permeates from the annular space between the liner and the pipeline of the riser 2. This system would allow both the gas and the liquid to be reintroduced into the production flow and transported to the surface. This would negate the need for the second vent port 20 at the top of the riser as the gas would be vented from the single base vent port 10.

Advantages of the fourth embodiment:

No umbilicals are required from the seabed to the surface for transport of permeates. This reduces the risk of damage to the venting system in operation;

No external equipment necessary to draw a vacuum in the annulus—the vacuum would be naturally created by the gas lift flow through the tank;

Can be incorporated to current standard gas lift/riser designs;

No need for topside venting equipment or umbilicals.

Figure 8:
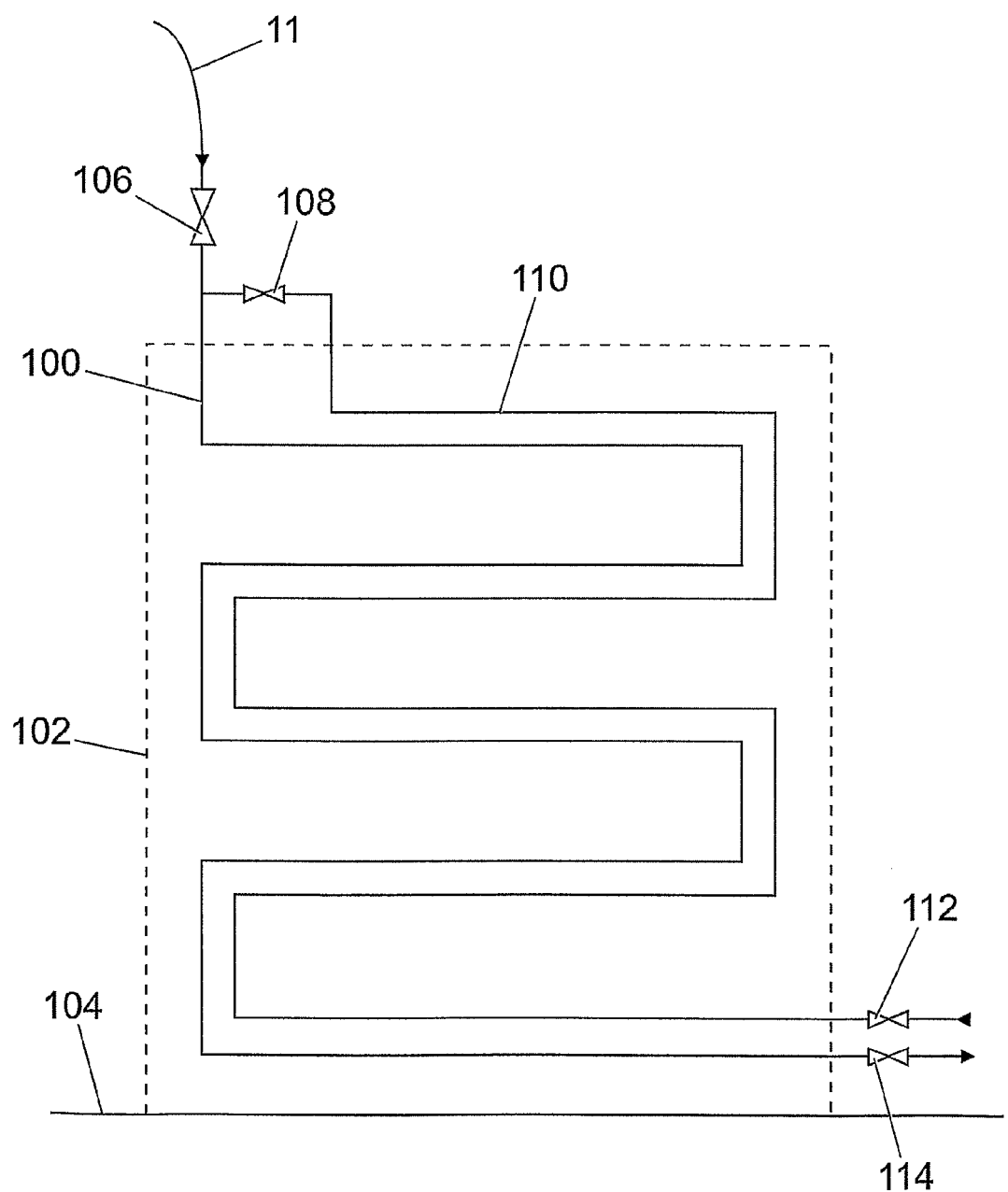
FIG. 8 is a schematic view of a storage tank for use with either of the first and second embodiments of the invention.

FIG. 8 illustrates a storage tank 12 for use with either of the first and second embodiments described above. The storage tank is defined by a section of small diameter pipe 100, identical or similar to the pipe used for the permeate jumper line 11, the storage pipe 100 being formed into a convoluted or serpentine shape and mounted within a frame 102 mounted on the seabed 104, whereby the storage pipe 100 can be used to collect permeate from the annular space between the inner walls of the riser 2 and the liner. A first valve 106 is provided at in inlet end of the pipe 100 for controlling communication between the storage pipe 100 and the jumper line 11.

To enable the storage pipe 100 to be drained, a further pipe 110, of similar diameter and construction to the storage pipe 100, is arranged in parallel to the storage pipe 100 and connected to an upper end of the storage pipe 100 via a second valve 108. An inlet end of the further pipe 110 is connected to a source of gas (e.g. air) from an umbilical termination unit and the lower end of the storage pipe 100 is connected to vent or drain pipe of the umbilical termination unit, each via a respective valves 112,114.

In normal operation, the second 108 and further 112,114 valves are closed and the first valve is open so that permeate from the permeate jumper line is collected in the storage pipe 100. When it is desired to drain the storage pipe 100, the first valve 106 is closed, to close communication between the storage pipe 100 and the jumper line 11, and the second 108 and further 112,114 valves are opened whereby air is supplied into the further pipe 110 from the umbilical termination unit via valve 112 and passes into an upper end of the storage pipe 100 via valve 108, thereby flushing out permeate from the storage pipe 100 into the vent or drain of the umbilical termination unit via valve 114. Thus a closed circuit is created between the further pipe 110 and the storage pipe 110 for flushing the storage pipe 100.

Various modifications and variations to the described embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiments.

The invention claimed is:

1. An apparatus for venting an annular space between a liner and a pipeline of a subsea riser for conveying hydrocarbons, said apparatus comprising:

permeate recovery apparatus configured for recovering permeate passing through the liner into said annular space;

said permeate recovery apparatus comprises a permeate collection vessel; a first vent port in a wall of the pipeline at or adjacent a lower region of the pipeline, a permeate recovery line communicating with the first vent port and configured for defining a flow path between said annular space and said permeate collection vessel; and a second vent port in a wall of said pipeline at or adjacent an upper region of said pipeline; a second permeate recovery line communicating with said second vent port for venting gaseous permeate from said annular space, said permeate collection vessel being connected to said first vent port for collecting primarily liquid permeate from said first vent port.

2. An apparatus as claimed in claim 1, further comprising a one-way valve associated with said permeate recovery line for preventing flow from said permeate recovery line into said annular space.

3. An apparatus as claimed in claim 1, wherein said permeate collection vessel is mounted on or formed integrally with a suction pile upon which the riser is supported.

4. An apparatus as claimed in claim 1, wherein said permeate collection vessel is comprised of one or more pipe sections, said pipe sections having ends and flanges or plugs closing said pipe section ends.

5. An apparatus as claimed in claim 1, wherein said permeate collection vessel has an upper region and a lower region, a first outlet port provided in said upper region of said collection vessel, a gaseous permeate recovery line with which said first outlet port communicates for receipt of gas from said collection vessel, and a second outlet port provided in said lower region of said collection vessel, a liquid permeate recovery line with which said second outlet port communicates for receipt of liquid from said collection vessel.

6. An apparatus as claimed in claim 5, further comprising a pump or other source of vacuum to which one or both of said gaseous and liquid permeate recovery lines are connected and operable for pumping or drawing said gaseous and/or liquid permeate to the surface of the sea and for generating a vacuum in at least one of collecting and disposing apparatus for the permeate.

7. An apparatus as claimed in claim 6, further comprising a collection or storage vessel on the sea surface to which at least one of the gaseous permeate recovery line and the liquid permeate recovery line is connected.

8. An apparatus as claimed in claim 1, further comprising a non-return valve associated with one of said second vent port and said second permeate recovery line for preventing a return flow of permeate from said second permeate recovery line to said annular space.

9. An apparatus as claimed in claim 1, further comprising a vacuum source, and said second permeate recovery line is connected to said vacuum source to draw gaseous permeate from said annular space.

10. An apparatus as claimed in claim 1, further comprising a storage vessel for storing collected permeate.

11. An apparatus as claimed in claim 1, wherein said permeate collection vessel connected with said first vent port is located on the seabed or a structure adjacent the seabed.

12. An apparatus as claimed in claim 11, further comprising a vacuum pump connected with said permeate collection vessel for aiding extraction of liquid permeate from the annular space adjacent said first vent port.

13. An apparatus as claimed in claim 11, further comprising a valve connected with said permeate collection vessel and operable to permit disconnection and recovery of said permeate collection vessel.

14. An apparatus as claimed in claim 1, wherein said collection vessel has a lower region, an outlet port of said permeate collection vessel at or adjacent said lower region thereof and communicating with said permeate recovery line, a valve connected with said outlet port and operable for selectively enabling fluid communication between said collection vessel and said permeate recovery line.

15. An apparatus for venting an annular space between a liner and a pipeline of a subsea riser for conveying hydrocarbons, said apparatus comprising permeate recovery apparatus configured for recovering permeate passing through the liner into said annular space;

said permeate recovery apparatus comprises a permeate collection vessel; a first vent port in a wall of the pipeline at or adjacent a lower region of the pipeline, a permeate recovery line communicating with the first vent port and configured for defining a flow path between said annular space and said permeate collection vessel; and a gas lift system connected with said permeate collection vessel and configured for urging production fluids up the riser, for entraining liquid permeate out of the permeate collection vessel by a flow of high speed and/or high pressure gas and for subsequently passing permeate into the riser with the production fluids, thereby returning the liquid permeate into the liner and recovering the liquid permeate to the surface with the production fluid.

16. An apparatus as claimed in claim 15, wherein said gas lift system is configured to inject high speed gas into the permeate collection vessel over the surface of collected liquid permeate within the collection vessel and to entrain said liquid permeate into said high speed gas flow, and a permeate and high speed gas outlet toward which said high speed gas is directed.

17. An apparatus as claimed in claim 15, further comprising a condensate recovery vessel having a lower region and said gas lift system is configured to inject high speed gas into said lower region of said condensate recovery vessel below a liquid level in said vessel to entrain the liquid permeate into said high speed gas flow.

18. An apparatus as claimed in claim 15, wherein said pipeline has an upper region, a second vent port in a wall of said pipeline at or adjacent said upper region of the pipeline, said permeate recovery line communicating with said second vent port, said second vent port is connected for venting gaseous permeate from said annular space, said permeate collection vessel collecting primarily liquid permeate from said first vent port.

19. An apparatus as claimed in claim 15, wherein said first vent port is configured to collect both gaseous and liquid condensate, and said gas lift system is configured so that gaseous and liquid condensate are entrained into said high speed gas flow of said gas lift system.

20. An apparatus as claimed in claim 19, wherein said gas lift system is configured so that flow of high speed gas into said condensate collection vessel creates a vacuum in said collection vessel which is operative for actively drawing condensate from said annular space.

21. An apparatus as claimed in claim 20, further comprising a venturi at said collection vessel for generating a vacuum in said collection vessel.

22. An apparatus as claimed in claim 19, further comprising a vacuum pump connected and operable for generating a vacuum in the permeate collection vessel.

23. An apparatus for venting an annular space between a liner and a pipeline of a subsea riser for conveying hydrocarbons, said apparatus comprising permeate recovery apparatus configured for recovering permeate passing through the liner into said annular space;

said permeate recovery apparatus comprises a permeate collection vessel; a first vent port in a wall of the pipeline at or adjacent a lower region of the pipeline, a permeate recovery line communicating with the first vent port and configured for defining a flow path between said annular space and said permeate collection vessel;

said collection vessel has a lower region, an outlet port of said permeate collection vessel at or adjacent said lower region thereof and communicating with said permeate recovery line, a valve connected with said outlet port and operable for selectively enabling fluid communication between said collection vessel and said permeate recovery line;

said permeate collection vessel has an upper region, a flushing port at or adjacent said upper region of said collection vessel, a flushing port valve connected with said flushing port, said flushing port being connectable to a supply of a fluid for selectively flushing permeate stored in said collection vessel out through said flushing port, a further valve operable for selectively closing communication between said permeate recovery line and said collection vessel when said flushing port valve is opened.

24. An apparatus as claimed in any of claim 23, wherein said permeate collection vessel comprises a first elongate pipeline having an upper end connected to said permeate recovery line and a lower end connected to or defining said outlet port.

25. An apparatus as claimed in claim 23, wherein said first pipeline is folded or is shaped into a serpentine or coiled form.

26. An apparatus as claimed in claim 24, wherein said first pipeline has a flushing inlet; said collection vessel comprises a further elongate pipeline extending between a supply of flushing fluid and said flushing inlet of said first pipeline.

* * * * *